United States Patent
Imoto et al.

(10) Patent No.: US 10,473,471 B2
(45) Date of Patent: Nov. 12, 2019

(54) EVACUATION GUIDING SYSTEM AND METHOD FOR SHIP

(71) Applicant: Mitsubishi Shipbuilding Co., Ltd., Kanagawa (JP)

(72) Inventors: Junpei Imoto, Tokyo (JP); Shingen Takeda, Tokyo (JP)

(73) Assignee: MITSUBISHI SHIPBUILDING CO., LTD., Kanagawa (JP)

( * ) Notice: Subject to any disclaimer, the term of this patent is extended or adjusted under 35 U.S.C. 154(b) by 126 days.

(21) Appl. No.: 15/561,970

(22) PCT Filed: Mar. 27, 2015

(86) PCT No.: PCT/JP2015/059555
§ 371 (c)(1),
(2) Date: Sep. 26, 2017

(87) PCT Pub. No.: WO2016/157279
PCT Pub. Date: Oct. 6, 2016

(65) Prior Publication Data
US 2018/0089785 A1   Mar. 29, 2018

(51) Int. Cl.
G01C 21/34     (2006.01)
G01C 21/20     (2006.01)
(Continued)

(52) U.S. Cl.
CPC ............ *G01C 21/34* (2013.01); *B63C 9/28* (2013.01); *G01C 21/206* (2013.01); *G06Q 10/04* (2013.01);
(Continued)

(58) Field of Classification Search
CPC .. B63C 9/02; B63C 9/28; G08B 7/062; G08B 7/066; G08B 21/10; G08B 27/005; G01C 21/206; G01C 21/34; G07C 9/00111
See application file for complete search history.

(56) References Cited

U.S. PATENT DOCUMENTS 5,765,500 A  *  6/1998  Nordbø ................ A62B 1/20
                                                 114/365
6,510,808 B1 *  1/2003  Tormålå ................ B63B 23/38
                                                 114/365
(Continued)

FOREIGN PATENT DOCUMENTS

JP    63-289176 A    11/1988
JP    2001-191978 A   7/2001
(Continued)

OTHER PUBLICATIONS

Written Opinion in PCT/JP2015/059555, dated Jun. 30, 2015. 13pp.
(Continued)

*Primary Examiner* — Ajay Vasudeva
(74) *Attorney, Agent, or Firm* — Hauptman Ham, LLP

(57) ABSTRACT

Provided in a system and a method for guiding evacuation in a ship are: a personal distribution information obtaining unit configured to obtain, based on information from cameras provided in the ship, passenger position information in predetermined areas in the ship; an evacuation route calculating unit configured to formulate, based on the passenger position information from the personal distribution information obtaining unit and passage passability information set from event information of evacuation, evacuation routes; an evacuation information managing unit configured to share information with the personal distribution information obtaining unit and the evacuation route calculating unit, and output the evacuation routes formulated by the evacuation route calculating unit; and an evacuation guiding unit configured to modify, based on the evacuation routes output by the evacuation information managing unit, evacuation guidance display provided in passages in the ship.

11 Claims, 14 Drawing Sheets

(51) Int. Cl.
  *G08B 7/06*   (2006.01)
  *G08B 27/00*  (2006.01)
  *G08B 21/10*  (2006.01)
  *G06Q 10/04*  (2012.01)
  *G06Q 10/06*  (2012.01)
  *G07C 9/00*   (2006.01)
  *B63C 9/02*   (2006.01)
  *B63C 9/28*   (2006.01)

(52) U.S. Cl.
  CPC ....... *G06Q 10/047* (2013.01); *G06Q 10/0635* (2013.01); *G08B 7/062* (2013.01); *G08B 7/066* (2013.01); *G08B 21/10* (2013.01); *G08B 27/005* (2013.01); *B63C 9/02* (2013.01); *G07C 9/00111* (2013.01)

(56) References Cited

U.S. PATENT DOCUMENTS

| | | | | |
|---|---|---|---|---|
| 6,778,071 | B2* | 8/2004 | Megerle | G08B 7/062 116/202 |
| 7,262,692 | B2* | 8/2007 | Ho | A62B 99/00 340/506 |
| 7,924,149 | B2* | 4/2011 | Mendelson | G01C 21/206 340/539.11 |
| 8,120,505 | B2* | 2/2012 | Bouressa | G07C 9/00111 340/539.1 |
| 9,080,883 | B2* | 7/2015 | Frey | G08B 7/066 |
| 9,681,280 | B2* | 6/2017 | Balthasar | H04W 4/90 |
| 2009/0102619 | A1 | 4/2009 | Blohberger et al. | |
| 2011/0084830 | A1* | 4/2011 | Kang | G08B 7/062 340/524 |
| 2012/0026008 | A1 | 2/2012 | Coleman | |

FOREIGN PATENT DOCUMENTS

| | | |
|---|---|---|
| JP | 3298940 B2 | 7/2002 |
| JP | 2003-109149 A | 4/2003 |
| JP | 2003-233658 A | 8/2003 |
| JP | 2003-271722 A | 9/2003 |
| JP | 2008252457 A | 10/2008 |
| JP | 2012-78971 A | 4/2012 |
| WO | 2009151166 A1 | 12/2009 |
| WO | 2012/015476 A1 | 2/2012 |

OTHER PUBLICATIONS

International Search Report in PCT/JP2015/059555, dated Jun. 30, 2015. 6pp.

Extended European Search Report for European Application No. 15887435.4 dated Sep. 7, 2018; 8pp.

Erik Vanem et al. 'Evaluating the cost-effectiveness of a monitoring system for improved evacuation from passenger ships', Safety Science 48 (2010) 788-802; 16 pp.

\* cited by examiner

FIG.4

INFORMATION ON CURRENT NUMBER OF PEOPLE IN EACH AREA

| AREA NUMBER | TOTAL OF PASSENGERS AND CREW MEMBERS | NUMBER OF PASSENGERS | NUMBER OF CREW MEMBERS |
|---|---|---|---|
| . | . | . | . |
| . | . | . | . |
| . | . | . | . |
| Z01D14-01 | 40 | 30 | 10 |
| Z02D14-01 | 30 | 25 | 5 |
| Z02D14-02 | 15 | 15 | 0 |
| Z03D14-01 | 20 | 20 | 0 |
| Z03D14-02 | | | |
| Z04D14-01 | | | |
| Z05D14-02 | | | |
| . | . | . | . |
| . | . | . | . |
| . | . | . | . |
| | | | |

FIG.5

PASSAGE INFORMATION (PASSABILITY)

| PASSAGE-STAIRWAY NUMBER | PASSABILITY |
|---|---|
| . | . |
| . | . |
| . | . |
| Z06D12-001 | 0 |
| Z06D12-002 | 1 |
| Z06D12-003 | 0 |
| Z06D12-004 | 0 |
| Z06D12-005 | . |
| Z06D12-006 | . |
| Z06D12-S01 | . |
| Z06D12-S02 | 0 |
| . | . |
| . | . |
| . | . |

FIG.6

RECOMMENDED PASSAGE

| PASSAGE NUMBER | GUIDED EVACUATION DIRECTION |
|---|---|
| Z01D01-001 | 0 |
| Z01D01-002 | 1 |
| Z01D01-003 | 0 |
| Z01D01-004 | 1 |
| . | . |
| . | . |
| . | . |
| Z01D02-001 | 0 |
| Z01D02-002 | 1 |
| Z01D02-003 | 1 |
| Z01D02-004 | 0 |
| . | . |
| . | . |
| . | . |

FIG.7

EVACUATION INFORMATION

| FIRE PROTECTION COMPARTMENT | NUMBER OF ARRIVING PEOPLE | EXPECTED EVACUATION COMPLETION TIME | REQUIRED TIME PERIOD |
|---|---|---|---|
| ALL | 2890 | 20130729234712 | 1100 |
| Z01 | 560 | 20130729233712 | 100 |
| Z02 | 380 | 20130729233912 | 300 |
| Z03 | 470 | 20130729234112 | 500 |
| Z04 | 540 | 20130729234312 | 700 |
| Z05 | 390 | 20130729234512 | 900 |
| Z06 | 550 | 20130729234712 | 1100 |
| . | . | . | . |
| . | . | . | . |
| . | . | . | . |
|  |  |  |  |

FIG.8

EVACUATION INFORMATION

| EXPECTED CURRENT POSITION | NAME | LAST CONFIRMED PLACE | NECESSITY OF RESCUE | GENDER | AGE | PASSENGER CABIN NUMBER | COMPLETION OF GATHERING | PLACE OF COMPLETION OF GATHERING | LIFEBOAT GUIDANCE INFORMATION |
|---|---|---|---|---|---|---|---|---|---|
| Z01D01-01 | TARO YAMADA | 01-05 | 1 | M | 53 | 03001 | 0 | 0 | 0 |
| Z01D01-01 | HANAKO YAMADA | 01-06 | 0 | F | 20 TO 29 | 05012 | 0 | 0 | 0 |
| Z01D01-01 | . | . | . | . | . | . | . | . | |
| Z01D01-01 | . | . | . | . | . | . | . | . | |
| Z01D01-01 | | | | | | | | | |
| Z01D01-02 | | | | | | | | | |
| . | | | | | | | | | |
| . | | | | | | | | | |
| Z01D01-03 | | | | | | | | | |
| . | | | | | | | | | |
| . | | | | | | | | | |
| Z08D01-01 | JIRO YAMADA | 08-01 | 0 | M | 38 | 06002 | 1 | Z08D01-01 | 1 |
| . | | | | | | | . | . | |
| . | | | | | | | . | . | |

EVACUATION GUIDING SYSTEM AND METHOD FOR SHIP

RELATED APPLICATIONS

The present application is a National Phase of International Application Number PCT/JP2015/059555, filed Mar. 27, 2015.

FIELD

The present invention relates to evacuation guiding system and method for a ship, such as a passenger ship.

BACKGROUND

Passenger ships are equipped with, as emergency evacuation equipment: life jackets in passenger cabins thereof; and lifeboats at broadsides thereof. If a disaster, such as a fire, occurs in such a passenger ship, passengers evacuate by: returning to their own rooms; wearing life jackets; gathering in a predetermined gathering place; and getting on lifeboats.

Conventional evacuation guiding systems for ships include, for example, those described in patent literature cited below.

CITATION LIST

Patent Literature

Patent Literature 1: Japanese Unexamined Patent Application Publication No. 2003-233658 A
Patent Literature 2: Japanese Patent No. 3298940 B
Patent Literature 3: Japanese Unexamined Patent Application Publication No. 2003-271722 A

SUMMARY

Technical Problem

In the above described evacuation method for ships, when a disaster occurs, passengers are supposed to return to their own rooms once, wear life jackets, and gather in a predetermined gathering place. However, when a disaster occurs, passengers are not necessarily near their own rooms, and are often scattered across various places in the ship. In that case, when the passengers return to their own rooms, routes of their movement may intersect one another, and quick evacuation becomes difficult.

The present invention solves the above described problem, and an object thereof is to provide evacuation guiding system and method for a ship, the system and method enabling evacuation guidance quickly and safely when a disaster occurs.

Solution to Problem

An evacuation guiding system for a ship according to the present invention includes a plurality of gathering places surrounded by a fire protection construction in the ship, a plurality of lifeboats equipped in a hull of the ship, a personal distribution information obtaining unit configured to obtain, based on information from a camera provided in the ship, passenger position information in a predetermined area in the ship, an evacuation route calculating unit configured to formulate, based on the passenger position information from the personal distribution information obtaining unit and passage passability information set from event information of evacuation, an evacuation route, an evacuation information managing unit configured to share information with the personal distribution information obtaining unit and the evacuation route calculating unit, and output the evacuation route formulated by the evacuation route calculating unit, an evacuation guiding unit configured to modify, based on the evacuation route output by the evacuation information managing unit, evacuation guidance display provided in a passage in the ship, and a gathering place managing unit configured to assign the lifeboats to be boarded, to a plurality of passengers who have evacuated to the plurality of gathering places.

Therefore, the personal distribution information obtaining unit obtains the passenger position information in the area from the information of the camera, the evacuation route calculating unit formulates the evacuation route from the passenger position information and the passage passability information, the evacuation information managing unit outputs the evacuation route, the evacuation guiding unit modifies, based on the evacuation route, the evacuation guidance display, and the gathering place managing unit assigns the lifeboats to the passengers who have evacuated to the gathering places. Therefore, when an unexpected event occurs, passengers are able to be guided for evacuation to gathering places surrounded by fire protection constructions in a ship quickly in a short period of time without confusion, and safety of the passengers is able to be secured.

In the evacuation guiding system for the ship according to the present invention, the camera is provided in a horizontal passage provided in a transverse bulkhead of the ship, and in a vertical passage communicating into upper and lower decks.

Therefore, images of a passenger passing through the horizontal passage of the transverse bulkhead and a passenger passing through the vertical passage are able to be captured by a plurality of cameras, the passengers moving among the respective areas are able to be properly grasped, and the passenger position information in the areas is able to be obtained with a high degree of accuracy.

In the evacuation guiding system for the ship according to the present invention, the personal distribution information obtaining unit is configured to obtain the passenger position information by recognizing a movement direction of a passenger based on an image acquired by the camera, and estimate the number of passengers in the area.

Therefore, since the personal distribution information obtaining unit estimates the number of passengers in the area by obtaining the passenger position information through the recognition of the movement direction of the passenger at all times, the personal distribution information obtaining unit is able to obtain the number of passengers in the area with a high degree of accuracy when a disaster occurs.

The evacuation guiding system for the ship according to the present invention, an RFID gate that is provided at a doorway of the gathering places and that is able to detect an RFID tag carried by a passenger, and a terminal that is able to share information wirelessly with the gathering place managing unit and that inputs, based on detection information from the RFID gate, a passenger to get on the lifeboats, are provided.

Therefore, since the RFID tag carried by the passenger is detected by the RFID gate provided at the doorway of the gathering places, and the terminal shares this detection information; by operating this terminal, the crew member is able to identify the passenger who has evacuated to the gathering places and is able to quickly determine passengers to get on the lifeboats.

In the evacuation guiding system for the ship according to the present invention, the gathering place managing unit is configured to count the number of passengers input when the passenger to get on the lifeboats is input by the terminal, and specify another lifeboat when this number of passengers reaches a passenger capacity of the lifeboats.

Therefore, just by the crew member inputting the passengers to get on the lifeboats through the terminal, the gathering place managing unit is able to efficiently execute the operation of assigning the passengers to the lifeboats and is able to quickly execute the evacuation guiding operation, by counting the number of the passengers input and specifying the other lifeboats when the number of passengers reaches the passenger capacity of the lifeboats.

In the evacuation guiding system for the ship according to the present invention, the evacuation route calculating unit is configured to formulate, based on the passenger position information and the passage passability information, evacuation routes, through which passengers are able to evacuate to the gathering places in a shortest period of time.

Therefore, since the evacuation route is formulated according to, instead of shortness of the evacuation routes, shortness of the time period for evacuation, the passengers are able to be quickly and efficiently evacuated to the gathering places.

In the evacuation guiding system for the ship according to the present invention, the evacuation route calculating unit is configured to generate, based on the passenger position information and the passage passability information, a recommended evacuation route file having: guided evacuation directions to the plurality of gathering places; the numbers of passengers expected to evacuate to the plurality of gathering places; expected times of completion of evacuation when the evacuation to the plurality of gathering places is completed; and expected time periods for completion of evacuation up to the completion of the evacuation to the plurality of gathering places.

Therefore, by the prediction for evacuation of the passengers to the convening rooms being made, actual guidance for evacuation of the passengers is able to be executed efficiently.

In the evacuation guiding system for the ship according to the present invention, the plurality of lifeboats are supported at broadsides where embarkation and disembarkation is possible from and to a lifeboat embarkation deck, on which the gathering places are provided.

Therefore, the passengers who have evacuated to the gathering places are able to be guided to the lifeboats from the lifeboat embarkation deck with little stairway movement, and the evacuation guiding operation is able to be executed efficiently.

In the evacuation guiding system for the ship according to the present invention, the gathering places are muster stations surrounded by fire protection bulkheads.

Therefore, by the gathering places being the muster stations, gathering places do not need to be secured separately in the ship, and space in the ship is able to be used efficiently.

In the evacuation guiding system for the ship according to the present invention, a central safety control unit configured to actuate an alarm device, based on the event information of evacuation that has been input, is provided, and the central safety control unit is configured to output the event information to the evacuation information managing unit.

Therefore, by the evacuation information managing unit sharing the information with the central safety control unit, efficiency of the evacuation guiding process is able to be increased and safety of the ship is able to be improved.

Further, an evacuation guiding method for a ship according to the present invention is an evacuation guiding method for a ship having a plurality of gathering places that have been preset in the ship, a plurality of lifeboats equipped in a hull of the ship, and a central safety control unit, to which event information of evacuation is input. An evacuation route is formulated from passenger position information and the event information of evacuation, evacuation guidance display provided in a passage in the ship is modified based on the evacuation route, RFID tags of passengers are detected by RFID gates provided at doorways of the gathering places and passenger ID information is obtained, when the passengers evacuate to the gathering places, and the lifeboats to be boarded by passengers are assigned based on the passenger ID information received from a terminal of a crew member and screen information of the event information, and the passengers are guided for evacuation.

Therefore, when an unexpected event occurs, passengers are able to be guided for evacuation to gathering places surrounded by fire protection constructions in a ship quickly in a short period of time without confusion, and safety of the passengers is able to be secured.

An evacuation guiding method for a ship according to the present invention is an evacuation guiding method for a ship having a plurality of gathering places that have been preset in the ship, a central safety control system, to which event information of evacuation is input, and a plurality of lifeboats. Passenger ID information is received at each of doorways of the plurality of gathering places upon an event of evacuation, and based on the passenger ID information and screen information on a terminal that displays thereon the event information from the central safety control system, passengers are guided for evacuation from the gathering places to any of the lifeboats.

Therefore, upon an event of evacuation, passengers are able to be guided for evacuation to gathering places surrounded by fire protection constructions in a ship quickly in a short period of time without confusion, and safety of the passengers is able to be secured.

Advantageous Effects of Invention

In evacuation guiding system and method for a ship, according to the present invention: since evacuation guidance display is modified by formulation of evacuation routes from passenger position information and passage passability information, the evacuation routes are reflected in evacuation routes guided by crew members, and passengers who have evacuated to gathering places are assigned to lifeboats; when an unexpected event occurs, the passengers are able to be guided for evacuation to the gathering places surrounded by fire protection constructions in the ship quickly in a short period of time without confusion, and safety of the passengers is able to be secured.

BRIEF DESCRIPTION OF DRAWINGS

FIG. 4 is a schematic diagram of a file indicating information on the current number of people in each area upon occurrence of a disaster.

FIG. 5 is a schematic diagram of a file indicating passage information upon occurrence of a disaster.

FIG. 6 is a schematic diagram of a file indicating recommended passages upon occurrence of a disaster.

FIG. 7 is a schematic diagram of a file indicating the expected number of arriving people evacuating to each fire protection compartment, expected times of completion of evacuation, and required time periods for the completion of evacuation.

FIG. 8 is a schematic diagram of a file indicating evacuation situations of passengers upon occurrence of a disaster.

DESCRIPTION OF EMBODIMENTS

Hereinafter, preferred embodiments of evacuation guiding system and method for a ship, according to the present invention, will be described in detail, by reference to the appended drawings. The present invention is not limited by these embodiments, and when there are several embodiments, the present invention includes those formed by combination of the respective embodiments.

Figure 11:
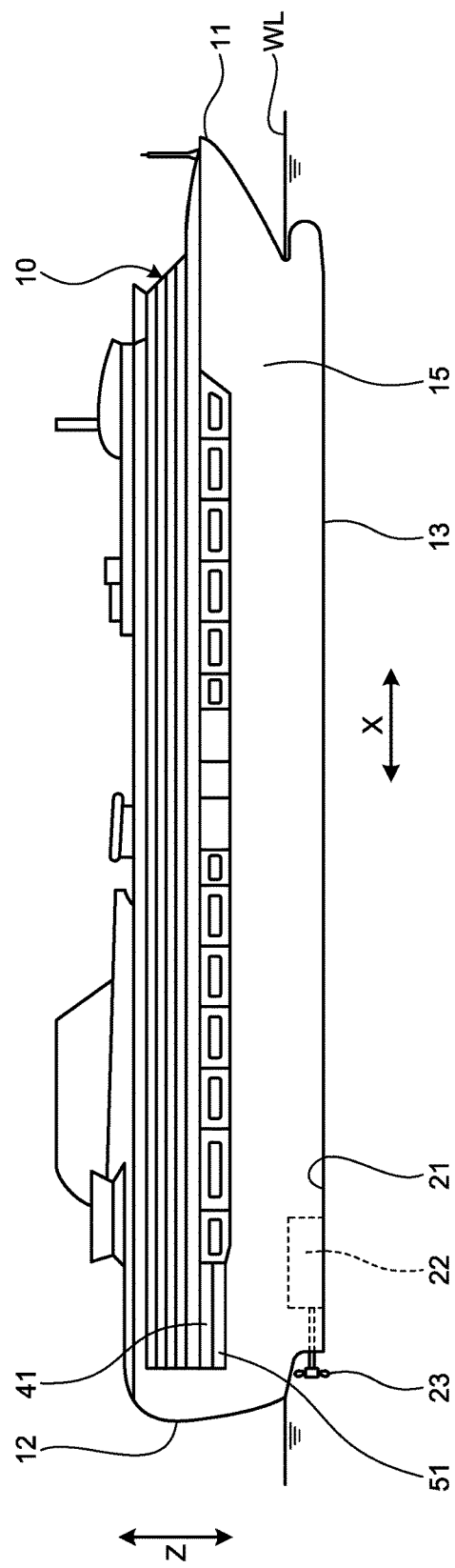
FIG. 11 is a side view illustrating a passenger ship.
Figure 12:
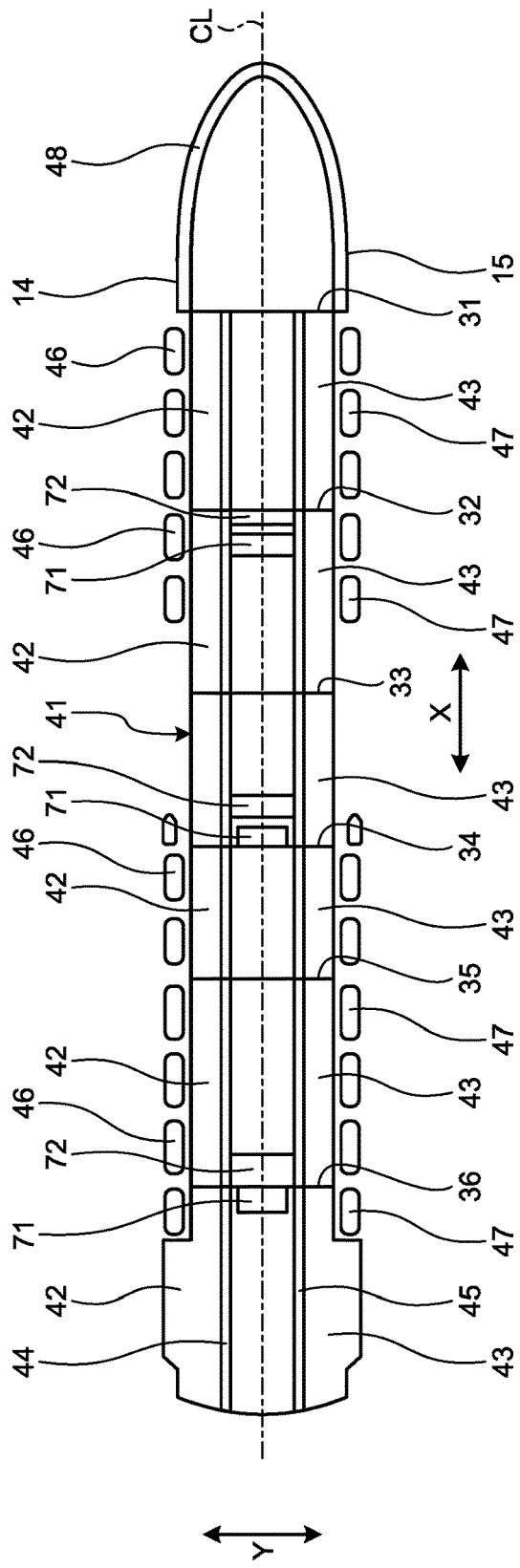
FIG. 12 is a schematic plan view illustrating an eighth deck.
Figure 13:
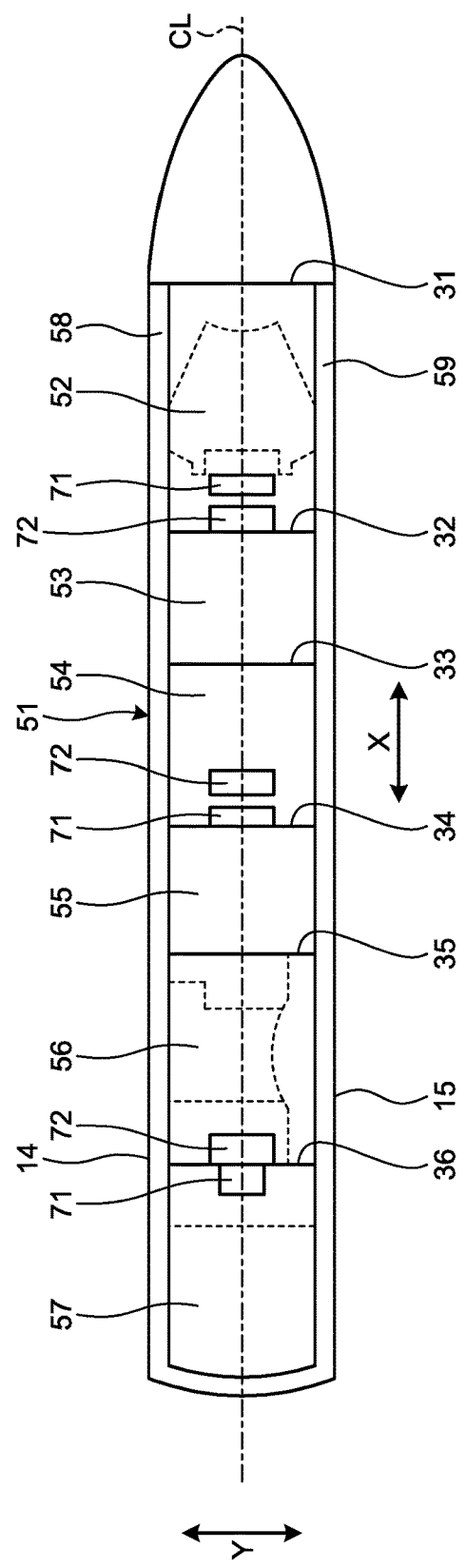
FIG. 13 is a schematic plan view illustrating a seventh deck.
Figure 14:
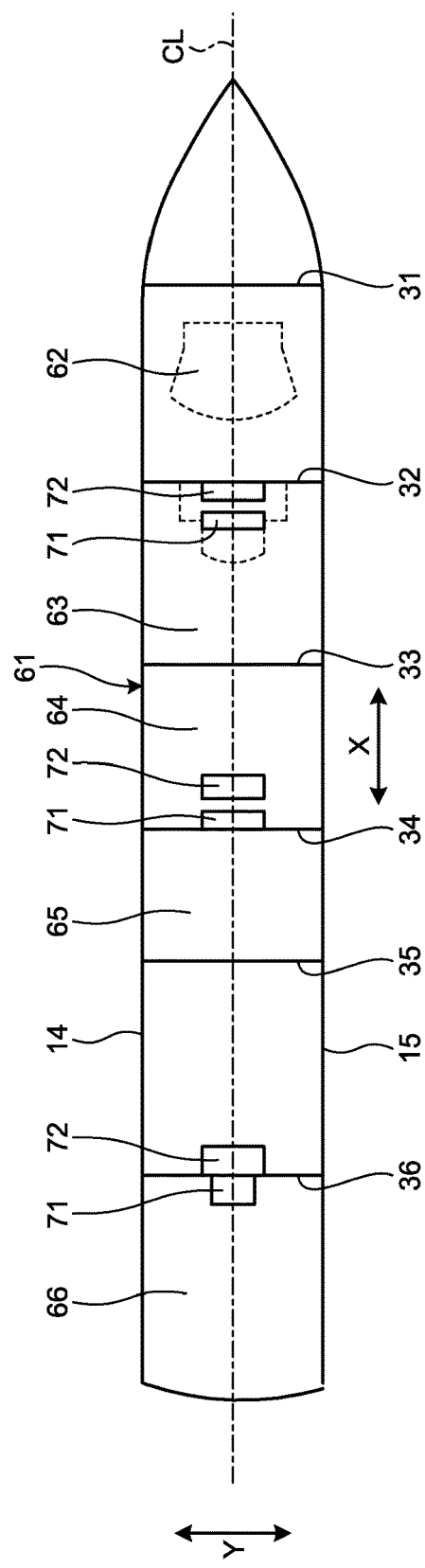
FIG. 14 is a schematic plan view illustrating a sixth deck.

FIG. 11 is a side view illustrating a passenger ship, FIG. 12 is a schematic plan view illustrating an eighth deck, FIG. 13 is a schematic plan view illustrating a seventh deck, and FIG. 14 is a schematic plan view illustrating a sixth deck.

In the passenger ship, which is a ship according to this embodiment, as illustrated in FIG. 11, a ship hull 10 has a ship bow 11, a ship stern 12, a ship bottom 13, a port 14 (see FIG. 12), and a starboard 15. In this embodiment, a ship length direction (front-back direction) of the ship hull 10 is referred to as a direction X, a ship width direction (width direction) as a direction Y, and a ship height direction (vertical direction) as a direction Z. Further, CL represents a width direction center position (center line) in the ship hull 10, and WL represents a load water line of the ship hull 10.

In the ship hull 10, a first deck to a fourteenth deck are provided by construction of the first deck to the fourteenth deck from the ship bottom 13 upward at predetermined height intervals. In this case, mainly a propulsion device, such as a main engine, an auxiliary machine, a ballast tank, and the like are provided on the first deck to the fourth deck. Further, recreational facilities, such as theaters and restaurants, are provided on the fifth deck to the seventh deck, and on the fourteenth deck to a fifteenth deck. Furthermore, passenger cabins and the like are provided on the eighth deck to the twelfth deck.

For example, an engine room is formed at the ship stern 12 side on a first deck 21, and a main engine (for example, a diesel engine) 22 is arranged in this engine room. A propeller 23 that transmits propulsive force is drivingly connected to this main engine 22.

Further, as illustrated in FIG. 12, by provision of a plurality of transverse bulkheads 31, 32, 33, 34, 35, and 36 thereon at predetermined intervals along the direction X, an eighth deck 41 is comparted into a plurality of spaces. On the eighth deck 41, a plurality of passenger cabins 42 and 43 are provided along the direction X at the port 14 and starboard 15 sides, and passages 44 and 45 are provided along the direction X at inner sides of these passenger cabins 42 and 43. Further, on the eighth deck 41, a plurality of lifeboats 46 and 47 are suspendingly supported outside the port 14 and the starboard 15 of the ship hull 10. Furthermore, on the eighth deck 41, a promenade (promenade deck) 48 is provided at the ship bow 11 side of the ship hull 10.

As illustrated in FIG. 13, similarly to the eighth deck 41, by provision of the plurality of transverse bulkheads 31, 32, 33, 34, 35, and 36 thereon at predetermined intervals along the direction X, a seventh deck (lifeboat deck) 51 is comparted into a plurality of spaces. On the seventh deck 51, a theater 52, a lounge bar 53, a shop 54, a restaurant 55, a cafe 56, and a restaurant 57 are provided in the respective spaces from the ship bow 11 side to the ship stern 12 side. Further, on the seventh deck 51, promenades (promenade decks) 58 and 59 are provided along the direction X at the port 14 and the starboard 15 of the ship hull 10, that is, outside the respective spaces, and are connected to each other at the ship stern 12 side. As described already, on the eighth deck 41, the plurality of lifeboats 46 and 47 are arranged outside the port 14 and the starboard 15, these lifeboats 46 and 47 are able to be lowered to the seventh deck 51, and upon emergency evacuation, passengers and crew members are able to get on the lifeboats 46 and 47 from the promenades 58 and 59 of this seventh deck 51.

As illustrated in FIG. 14, similarly to the eighth deck 41 and the seventh deck 51, by provision of the plurality of transverse bulkheads 31, 32, 33, 34, 35, and 36 thereon at predetermined intervals along the direction X, a sixth deck (lifeboat deck) 61 is comparted into a plurality of spaces. On the sixth deck 61, a theater 62, a lounge bar 63, a casino 64, a shop 65, and a restaurant 66 are provided in the respective spaces from the ship bow 11 side to the ship stern 12 side.

Elevators 71 and stairways 72 are provided to penetrate through the eighth deck 41, the seventh deck 51, and the sixth deck 61 in the direction Z. These elevators 71 and stairways 72 are arranged to penetrate through decks above the eighth deck 41 and decks below the sixth deck 61. Further, the theater 52 on the seventh deck 51 and the theater 62 on the sixth deck 61 communicate into each other in the direction Z. The transverse bulkheads 31, 32, 33, 34, 35, and 36 are basically provided so as to be integral and continuous in the direction Z of the ship hull 10, but since the theater 52 on the seventh deck 51 and the theater 62 on the sixth deck 61 penetrate into each other, the transverse bulkhead 32 is provided to be positionally displaced toward the ship stern 12.

Figure 1:
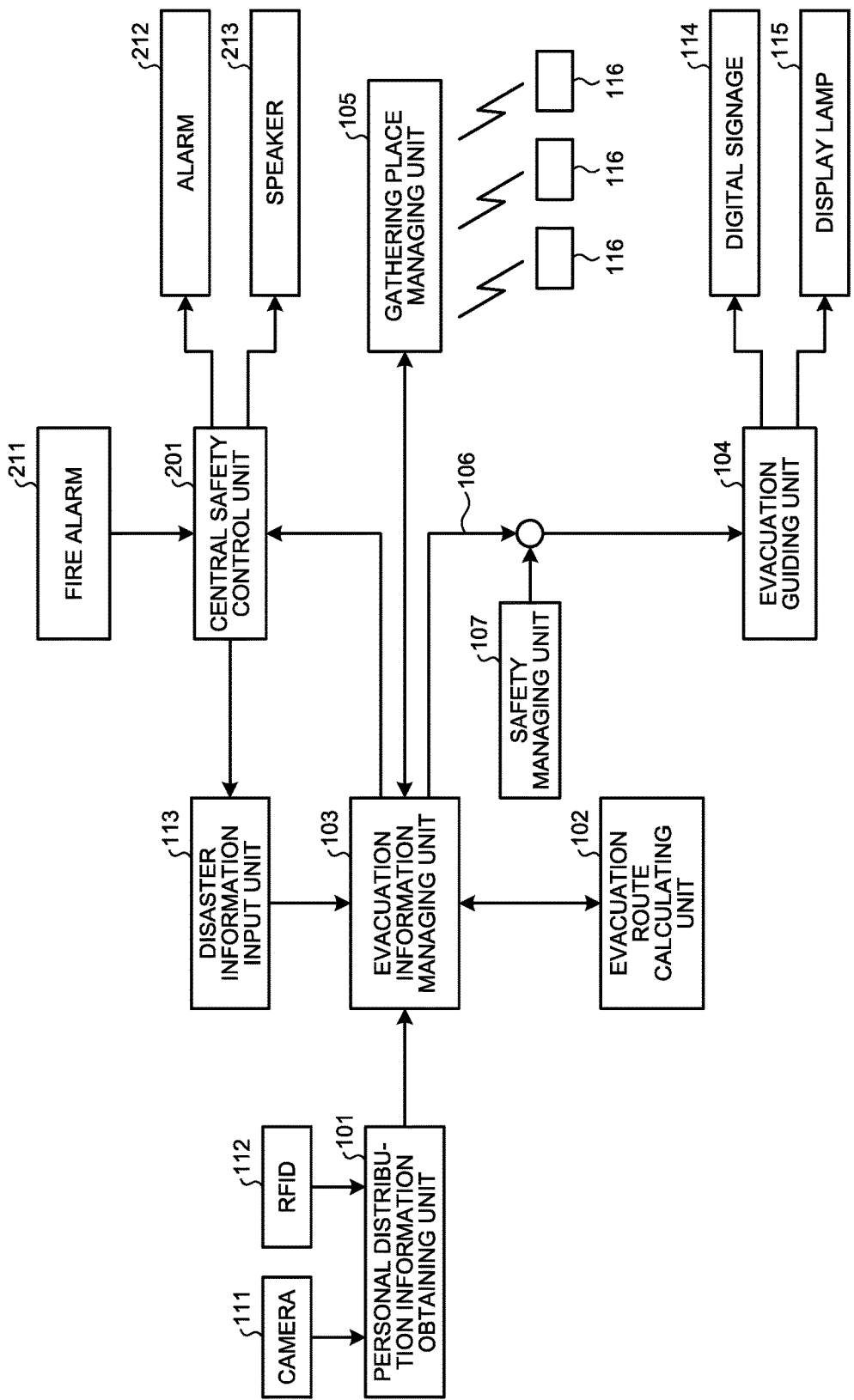
FIG. 1 is a diagram of a schematic configuration illustrating an evacuation guiding system for a ship, according to an embodiment.
Figure 2:
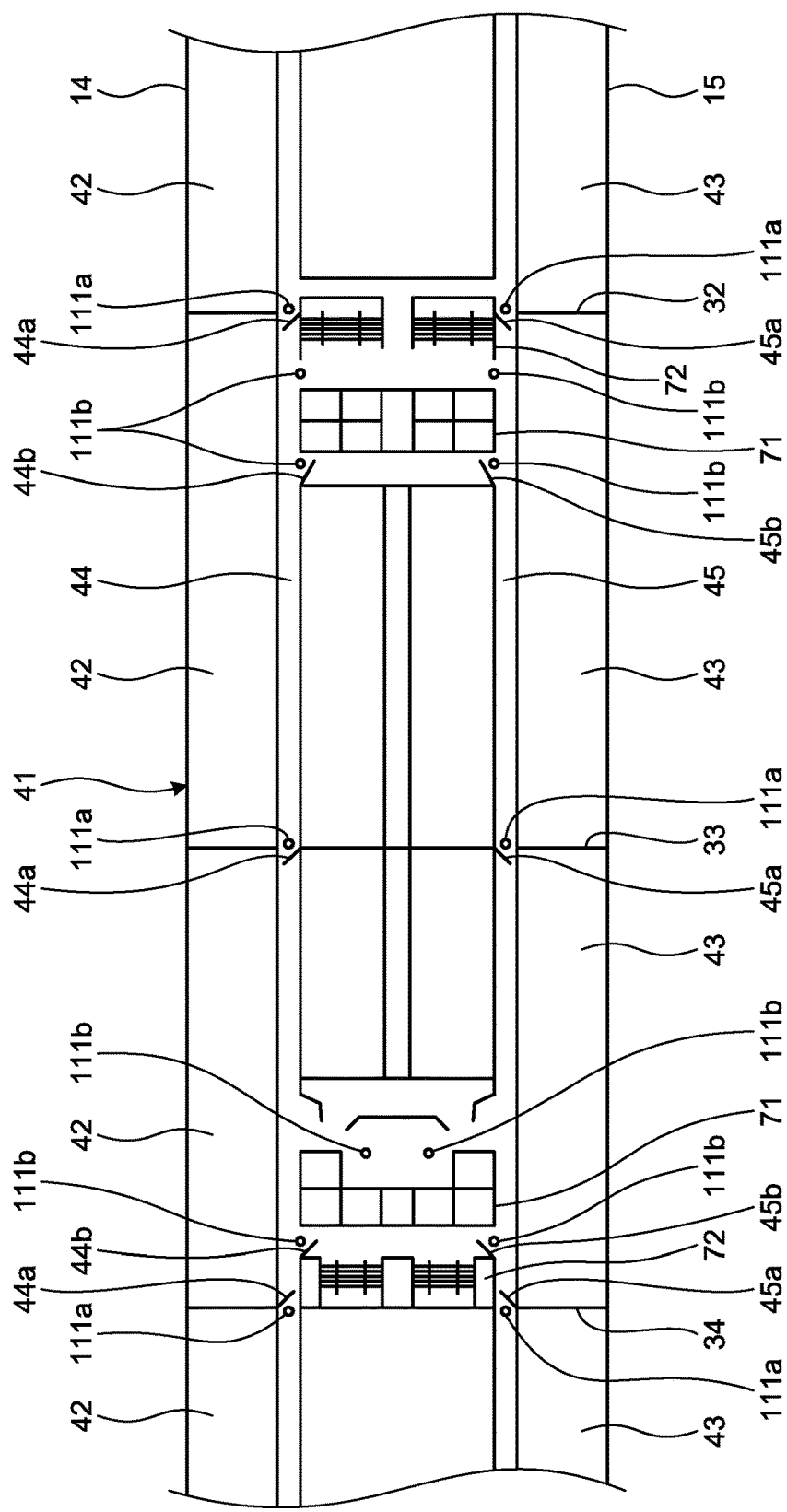
FIG. 2 is a schematic diagram of inside of the ship equipped with cameras.
Figure 3:
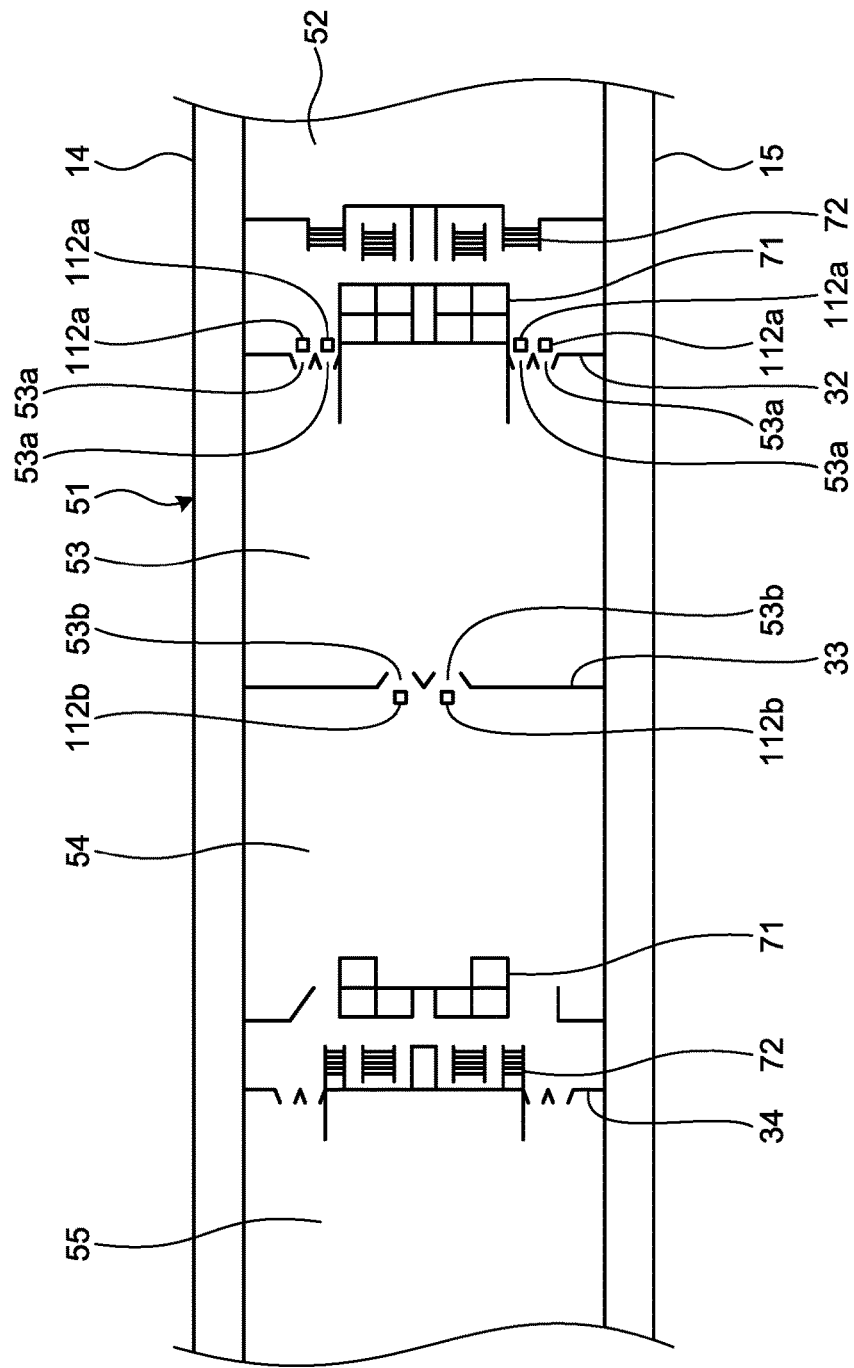
FIG. 3 is a schematic diagram of muster stations (convening rooms) equipped with RFID gates.

An evacuation guiding system, which is used when a disaster, such as a fire, occurs, is mounted on such a passenger ship. FIG. 1 is a diagram of a schematic configuration illustrating an evacuation guiding system for a ship, according to this embodiment, FIG. 2 is a schematic diagram of inside of the ship equipped with cameras, FIG. 3 is a schematic diagram of muster stations (convening rooms) equipped with RFID gates, FIG. 4 is a schematic diagram of a file indicating information on the current number of people in each area upon occurrence of a disaster, FIG. 5 is a schematic diagram of a file indicating passage information upon occurrence of a disaster, FIG. 6 is a schematic diagram of a file indicating recommended passages upon occurrence of a disaster, and FIG. 7 is a schematic diagram of a file indicating the expected number of arriving people evacuating to each fire protection compartment, expected times of completion of evacuation, and required time periods for the completion of evacuation.

In the evacuation guiding system for a ship, according to this embodiment, when a disaster occurs, passengers are convened to a plurality of gathering places that have been preset in the ship, life jackets are distributed to the passengers at these gathering places, and many passengers wearing the life jackets are guided to the plurality of lifeboats 46 and 47 equipped in the ship hull 10 from these gathering places and embarked thereon. In this case, the gathering places have a size sufficient to receive people expected upon evacuation, and are areas surrounded by the most important fire protection constructions. In the passenger ship of this embodiment, as described already, each of the decks 41, 51, and 61 of the ship hull 10 is comparted into the plurality of spaces by the plurality of transverse bulkheads 31, 32, 33, 34, 35, and 36, and in each of these spaces, a muster station (convening room) is provided. These muster stations (convening rooms) are, for example, the theaters 52 and 62, the lounge bar 53, the shop 54, the restaurant 55, the cafe 56, the restaurant 57, the lounge bar 63, and the like. These theaters 52 and 62, lounge bar 53, shop 54, restaurant 55, cafe 56, restaurant 57, and lounge bar 63, which are used as the muster stations (convening rooms) are formed by being surrounded by predetermined fire protection walls in spaces comparted by the plurality of transverse bulkheads 31, 32, 33, 34, 35, and 36.

This evacuation guiding system has, as illustrated in FIG. 1, a personal distribution information obtaining unit 101, an evacuation route calculating unit 102, an evacuation information managing unit 103, an evacuation guiding unit 104, and a gathering place managing unit 105. A plurality of cameras 111 and a plurality of RFID gates (receivers) 112 are connected to the personal distribution information obtaining unit 101. A disaster information input unit 113 is connected to the evacuation information managing unit 103. A plurality of digital signages 114 and display lamps 115 are connected to the evacuation guiding unit 104. Further, a safety managing unit 107 is connected to a line 106 connecting the evacuation information managing unit 103 and the evacuation guiding unit 104 to each other. A plurality of operation terminals 116 are connected to the gathering place managing unit 105.

Further, in the ship, a central safety control unit 201 is provided, and a plurality of fire alarms 211, a plurality of alarms 212, and a plurality of speakers 213 are connected to the central safety control unit 201. The central safety control unit 201 is connected to the evacuation information managing unit 103 and the disaster information input unit 113.

Based on information from the plurality of cameras 111 provided in the ship, the personal distribution information obtaining unit 101 obtains passenger position information of predetermined areas in the ship (the respective spaces comparted by the transverse bulkheads 31, 32, 33, 34, 35, and 36). That is, as illustrated in FIG. 2, the eighth deck 41 is comparted into a plurality of spaces by the plurality of transverse bulkheads 32, 33, and 34, the passenger cabins 42 and 43 are provided in each of these spaces, the passages 44 and 45 are provided on the eighth deck 41, and the elevators 71 and stairways 72 are provided at predetermined positions on the eighth deck 41. Each of the passages 44 and 45 is a horizontal passage, fire protection doors 44a and 45a are provided correspondingly to positions of the transverse bulkheads 32, 33, and 34, and cameras 111a for detecting passengers and crew members moving in a horizontal direction are provided at these positions. Further, the respective elevators 71 and the respective stairways 72 are vertical passages, fire protection doors 44b and 45b are provided correspondingly to portions between the respective passages 44 and 45 and the respective elevators 71 and stairways 72, and cameras 111b for detecting passengers and crew members moving in the vertical direction are provided at these positions. Although the cameras 111a and 111b are arranged in the passages 44 and 45 and at the elevators 71 and stairways 72, cameras 111a and 111b may be additionally arranged in various areas, and may double as security cameras or the like.

The personal distribution information obtaining unit 101 processes images acquired by the cameras 111 (111a and 111b) and executes, for example, recognition of movement loci (movement directions) from the captured images, to thereby obtain passenger position information and estimate the numbers of crew members and passengers who are in each area. Further, by recognition of faces of the passengers and crew members from the captured images, individual movement loci may be recognized and passenger position information may be obtained. In this case, a movement direction of a passenger is whether the passenger has gone through the transverse bulkheads 31, 32, 33, 34, 35, and 36 toward the ship bow or toward the ship stern, or whether the passenger has gone through the first deck to the fourteenth deck toward the ship bottom or toward an upper deck, and recognition thereof is executed.

Further, as illustrated in FIG. 1, based on information from the plurality of RFID gates 112 provided in the ship, the personal distribution information obtaining unit 101 obtains passenger position information in predetermined muster stations in this ship. That is, the passengers and the crew members carry ID cards, to which RFID tags have been attached. As illustrated in FIG. 3, the seventh deck 51 is comparted into a plurality of spaces by the plurality of transverse bulkheads 32, 33, and 34, and the theaters 52 and 62, the lounge bar 53, the shop 54, and the restaurant 55 are provided in the respective spaces. For example, in the lounge bar 53, doorways (fire protection doors) 53a are provided at the transverse bulkhead 32 that is at one side in the direction X, and RFID gates 112a for detecting passengers and crew members are provided at these positions. Furthermore, in the lounge bar 53, doorways (fire protection doors) 53b are provided at the transverse bulkhead 33 that is at the other side in the direction X, and RFID gates 112b for detecting passengers and crew members are provided at these positions.

By detecting RFID tags of ID cards, the RFID gates (112a and 112b) detect that crew members and passengers have passed the doorways 53a and 53b, and output the result to the personal distribution information obtaining unit 101. Based on the information (passenger position information) obtained by the RFID gates 112 (112a and 112b), the personal distribution information obtaining unit 101 measures the numbers of passengers and crew members being in the lounge bar 53, and obtains personal information of the passengers and crew members.

Although only particular areas and muster stations on the eighth deck 41 and the seventh deck 51 have been described, particular areas and muster stations on the other decks have substantially the same configurations.

Based on the event information of evacuation (event information of disaster occurrence) received from the central safety control unit 201, the disaster information input unit 113 detects passage passability information, and inputs this passage passability information to the evacuation information managing unit 103. In this case, the disaster information input unit 113 may input the passage passability information to the evacuation information managing unit 103 automatically, or a crew member may input the passage passability information manually. The evacuation information managing unit 103 outputs the passenger position information from the personal distribution information obtaining unit 101 and the passage passability information from the disaster information input unit 113, to the evacuation route calculating unit 102. Based on the passenger position information and the passage passability information, the evacuation route calculating unit 102 formulates evacuation routes.

In this case, based on the passenger position information and passage passability information, the evacuation route calculating unit 102 formulates evacuation routes that enable the passengers to evacuate to the muster stations in the shortest period of time. That is, from the passenger position information, the number of people who are in each area when a disaster occurs is able to be estimated. In consideration of the passage passability information, a muster station, to which evacuation is possible in the shortest period of time from each area is selected, and that evacuation route is set. Specifically, based on the passenger position information and the passage passability information, the evacuation route calculating unit 102: generates a recommended evacuation route file having: guided evacuation directions to the plurality of muster stations; the numbers of passengers expected to evacuate to the plurality of muster stations; expected times of completion of evacuation when the evacuation to the plurality of muster stations is completed; and expected time periods for completion of evacuation up to the completion of the evacuation to the plurality of muster stations; and outputs this recommended evacuation route file to the evacuation information managing unit 103.

In this recommended evacuation route file, for example, as illustrated in FIG. 4, for the passenger position information, the numbers of passengers and crew members and the number of all of these people, who are currently in each numbered area are displayed. For the passage passability information, as illustrated in FIG. 5, whether passable (0) or impassable (1) is displayed correspondingly to passage numbers and stairway numbers. Further, for the guided evacuation directions to the muster stations, as illustrated in FIG. 6, whether being the same as the normal direction (0) or being changed to a reverse direction (1) is displayed corresponding to each passage number. For the numbers of passengers expected to evacuate to the muster stations, the expected times of completion of evacuation, and the expected time periods for completion of evacuation, as illustrated in FIG. 7, display is executed individually for the muster stations (fire protection compartments).

Based on the evacuation routes (the guided evacuation directions to the muster stations) output by the evacuation information managing unit 103, the evacuation guiding unit 104 modifies evacuation guidance display (digital signages 114, and display lamps 115) provided in passages in the ship. The safety managing unit 107 gives approval (disapproval) to the evacuation routes output by the evacuation information managing unit 103 to the evacuation guiding unit 104, and practically, a crew member corresponding to a captain or a safety supervisor gives the approval (disapproval). Based on the evacuation routes that have been approved by the safety managing unit 107, the evacuation guiding unit 104 modifies the evacuation guidance display. That is, the evacuation guidance display is modified, such that the evacuation time period becomes the shortest.

The gathering place managing unit 105 assigns the lifeboats 46 and 47 to be boarded, to the plurality of passengers and crew members who have evacuated to the plurality of muster stations. The evacuation information managing unit 103 outputs, for example, the evacuation routes (recommended evacuation route file), and the personal information of the passengers and crew members (RFID tag number, name, gender, age, and necessity of support), to the gathering place managing unit 105. As described already, the passengers and the crew members carry the ID cards, to which the RFID tags have been attached. Therefore, when the passengers and crew members carrying the ID cards evacuate to the muster stations through the RFID gates 112, the RFID gates 112 detect the RFID tags of the ID cards, identify the crew members and the passengers, and output it to the personal distribution information obtaining unit 101. The personal distribution information obtaining unit 101 outputs this information to the gathering place managing unit 105 through the evacuation information managing unit 103. The gathering place managing unit 105 is then able to know the passengers and crew members who have evacuated to the particular muster stations.

Each of the operation terminals 116 is able to share information wirelessly with the gathering place managing unit 105. Therefore, through the operation terminal 116, from the information from the gathering place managing unit 105, a crew member who is in a muster station is able to grasp passengers and crew members who have evacuated to this muster station, and inputs passengers who are getting on the lifeboats 46 and 47. When names of the passengers to get on the lifeboats 46 and 47 are input by the operation terminal 116, the gathering place managing unit 105 counts the number of passengers that have been input, and if this number of passengers reaches the passenger capacity of the lifeboats 46 and 47, the gathering place managing unit 105 specifies other lifeboats 46 and 47.

The operation terminal 116 is, for example, a touch panel type tablet PC, and on an operation screen thereof, as illustrated in FIG. 8, expected current positions, names, last confirmed places, necessity of rescue, gender, age, passenger cabin numbers, completion of gathering in muster stations, places of completion of gathering, situations of guidance to lifeboats, and the like are displayed.

The evacuation information managing unit 103 shares information with the personal distribution information obtaining unit 101, the disaster information input unit 113, the evacuation route calculating unit 102, the evacuation guiding unit 104, the gathering place managing unit 105, and the central safety control unit 201.

Further, the fire alarms 211, the alarms 212, and the speakers 213 are connected to the central safety control unit 201. When a disaster occurs and a fire is caused in the ship, the fire alarms 211 are actuated, and thus the central safety control unit 201 recognizes the fire in the ship, actuates the alarms 212, and guidance for emergency evacuation is broadcast by the speakers 213. Further, the central safety control unit 201 outputs the event of occurrence of the fire to the disaster information input unit 113, and receives evacuation routes (recommended evacuation route file) from the evacuation information managing unit 103.

Figure 9:
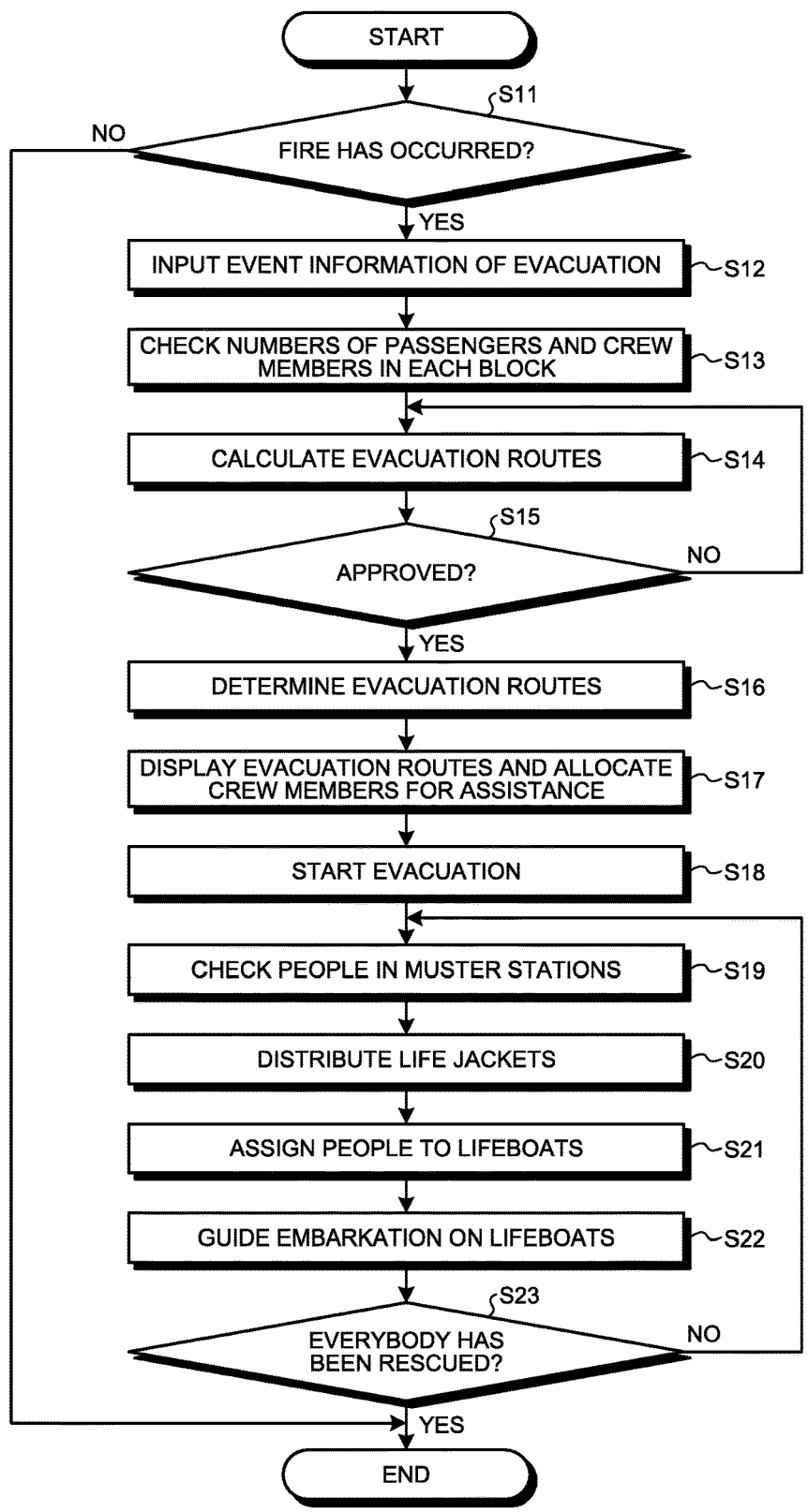
FIG. 9 is a flow chart illustrating an evacuation guiding method by the evacuation guiding system for the ship, according to this embodiment.
Figure 10:
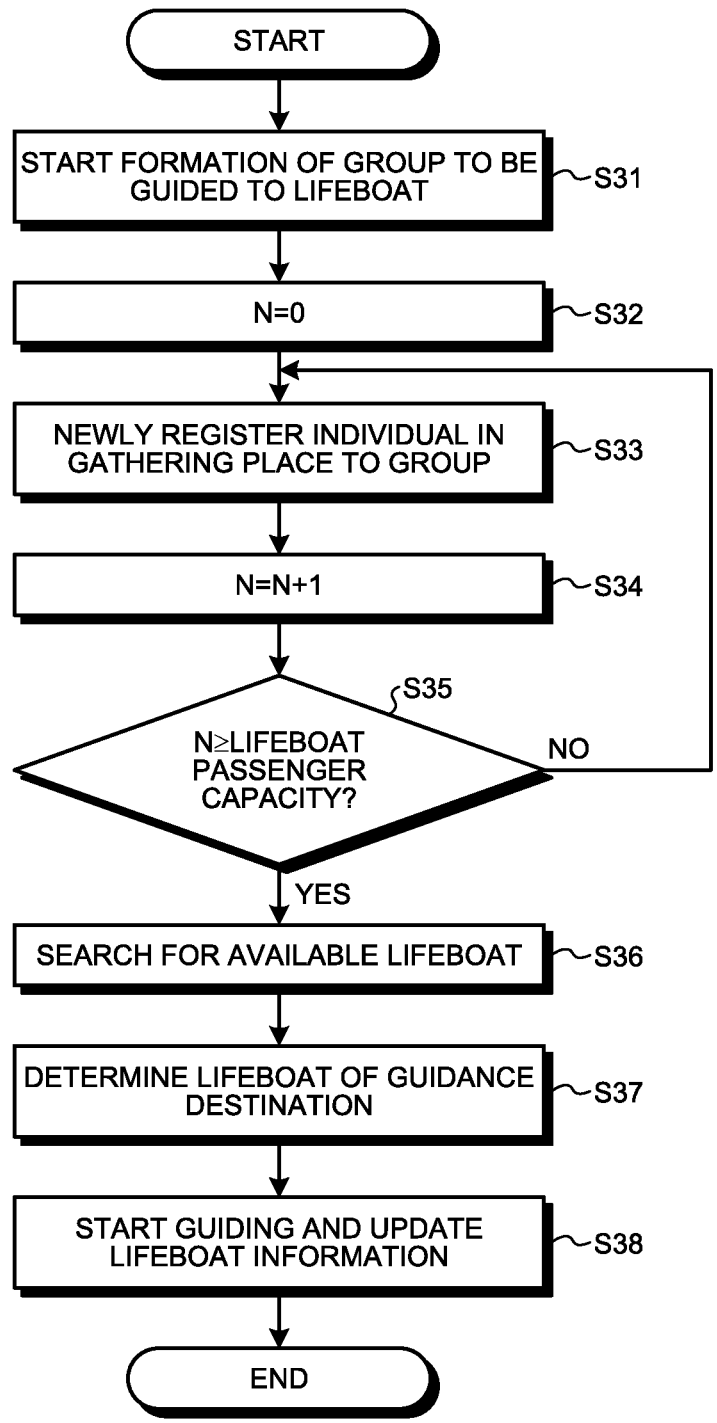
FIG. 10 is a flow chart illustrating a process of assigning people to lifeboats.

An evacuation guiding method by the evacuation guiding system for a ship, according to this embodiment, will now be described in detail. FIG. 9 is a flow chart illustrating the evacuation guiding method by the evacuation guiding system for a ship, according to this embodiment, and FIG. 10 is a flow chart illustrating a process of assigning people to lifeboats.

In the evacuation guiding method for a ship, according to this embodiment, passengers are guided for evacuation by: formulating an evacuation route from passenger position information and event information of evacuation; modifying, based on the evacuation route, evacuation guidance display provided in a passage in the ship; obtaining passenger ID information by the RFID gate 112 detecting an RFID tag carried by a passenger when the passenger evacuates to a gathering place (muster station), the RFID gate 112 being provided at a doorway; and the operation terminal 116 receiving the passenger ID information and the event information, the operation terminal 116 being held by a crew member; and assigning, based on screen information on the operation terminal 116, a plurality of passengers to lifeboats 46 and 47 to be boarded.

That is, as illustrated in FIG. 1 and FIG. 9, at Step S11, the central safety control unit 201 determines whether a fire has occurred in the ship. This determination is made by actuation of the fire alarms 211, or a report from a crew member or a passenger. If it is determined that no fire has occurred in the ship (No), this routine is left without anything being done. In contrast, if it is determined that a fire has occurred in the ship (Yes), the central safety control unit 201 actuates the alarms 212 and broadcasts guidance for emergency evacuation through the speakers 213. The central safety control unit 201 outputs event information indicating that a fire has occurred, to the disaster information input unit 113.

At Step S12, based on event information of evacuation received from the central safety control unit 201, the disaster information input unit 113 detects passage passability information, and inputs this passage passability information to the evacuation information managing unit 103.

At Step S13, based on the event information of evacuation from the disaster information input unit 113, the evacuation information managing unit 103 outputs a command to the personal distribution information obtaining unit 101, and the personal distribution information obtaining unit 101 obtains passenger position information of predetermined areas in the ship based on information from the plurality of cameras 111 (111a and 111b). Specifically, the personal distribution information obtaining unit 101 processes images acquired by the cameras 111 (111a and 111b), and estimates the numbers of crew members and passengers in each area. In this case: by increase in image capturing precision of the cameras 111 or in image processing precision, identification of the crew members and passengers, and comparison thereof to preregistered personal data; names of the crew members and passengers may be grasped. Further, since the RFID gates 112 (112a and 112b) are provided at the doorways of the respective areas, the evacuation information managing unit 103 may receive signals (detection information) from the RFID gates 112, and grasp the numbers and names of the passengers and crew members who are in the respective areas. The personal distribution information obtaining unit 101 then outputs the estimated numbers (names) of the passengers and crew members in the respective areas, to the evacuation information managing unit 103.

At Step S14, when the evacuation information managing unit 103 outputs the passenger position information from the personal distribution information obtaining unit 101 and the passage passability information from the disaster information input unit 113 to the evacuation route calculating unit 102, the evacuation route calculating unit 102 calculates, based on the passenger position information and the passage passability information, evacuation routes. These evacuation routes are evacuation routes, through which many passengers are able to evacuate safely in the shortest time period to the muster stations, and are the recommended evacuation route file having: the guided evacuation directions to the muster stations; the numbers of passengers expected to evacuate to the muster stations; the expected times of completion of evacuation when the evacuation to the muster stations is completed; and the expected time periods for completion of evacuation up to the completion of the evacuation to the muster stations. The evacuation route calculating unit 102 outputs the calculated evacuation routes, to the evacuation information managing unit 103.

When the evacuation information managing unit 103 outputs these evacuation routes to the evacuation guiding unit 104; at Step S15, the safety managing unit 107 gives approval (disapproval) to the evacuation routes. If the captain does not give approval (No), the routine is returned to Step S14, and the evacuation route calculating unit 102 recalculates the evacuation routes. In contrast, if the captain gives approval (Yes): at Step S16, the evacuation routes are determined; and at Step S17, based on the evacuation routes (guided evacuation directions to the muster stations) output by the evacuation information managing unit 103, the evacuation guiding unit 104 modifies the evacuation guidance display (digital signages 114 and display lamps 115). Further, upon this modification, crew members for assistance are allocated.

As described above, when a disaster occurs, quick and safe evacuation guidance is able to be executed by many passengers and crew members being informed of a fire and being informed of evacuation routes early. In this case, since many passengers and crew members are scattered everywhere in the ship, the guided evacuation routes are those enabling the passengers and crew members to evacuate in the shortest period of time, and the passengers and crew members respectively evacuate to different muster stations.

At Step S18, evacuation of passengers is started. When many passengers and crew members are guided for evacuation to the predetermined muster stations through the evacuation routes, the passengers and crew members evacuate through the doorways of the muster stations. Upon this evacuation, by detecting RFID tags of ID cards carried by the passengers and crew members, the RFID gates 112 (112a and 112b) provided at the doorways recognize the evacuated crew members and passengers, and output it to the personal distribution information obtaining unit 101. At Step S19, based on information (passenger position information) obtained by the RFID gates 112 (112a and 112b), the personal distribution information obtaining unit 101 measures the numbers of passengers and crew members who have evacuated to the muster stations, and obtains personal information of the passengers and crew members.

Each muster station is equipped with life jackets corresponding to the number of passengers and crew members predicted to evacuate thereto, and at Step S20, a crew member of each muster station distributes life jackets to the passengers and crew members who have evacuated thereto. At Step S21, the gathering place managing unit 105 assigns the lifeboats 46 and 47 to be boarded, to the passengers and crew members who have evacuated to the plurality of muster stations. In this case, the crew member carries the operation terminal 116, and through this operation terminal 116, the crew member grasps the passengers and crew members who have evacuated to the muster station and inputs the passengers to get on the lifeboats 46 and 47. When names of the passengers to get on the lifeboats 46 and 47 are input by the operation terminal 116, the gathering place managing unit 105 counts the number of passengers that have been input, and if this number of passengers reaches the passenger capacity of the lifeboats 46 and 47, the gathering place managing unit 105 specifies other lifeboats 46 and 47.

That is, as illustrated in FIG. 10, at Step S31, formation of a group to be guided to predetermined lifeboats 46 and 47 is started. At Step S32, a count number N is reset to "0". At Step S33, a passenger who has evacuated to a muster station is newly registered sequentially in this guided group. At Step S34, the count number N is then incremented by "1". At Step S35, whether the number N of passengers who have been registered in the guided group has reached the passenger capacity of the lifeboats is determined. If it is determined that the number N of passengers who have been registered in the guided group has not reached the passenger capacity of the lifeboats (No), the routine is returned to Step S33, and the processing is repeated. In contrast, if it is determined that the number N of passengers who have been registered in the guided group has reached the passenger capacity of the lifeboats (Yes), at Step S36, available lifeboats 46 and 47 are searched for, and at Step S37, lifeboats 46 and 47 to which the passengers are guided are determined. Thereafter, at Step S38, the guided group of registered passengers is guided to the determined lifeboats 46 and 47, and data are updated. The crew member executes this processing by using the operation terminal 116, and when the processing is ended, the data are transmitted to the gathering place managing unit 105 and updated.

In FIG. 9, when assignment of lifeboats 46 and 47 to be boarded to passengers and crew members is completed; at Step S22, the crew members guide the passengers and crew members to get on the predetermined lifeboats 46 and 47. At Step S23, it is then determined whether rescue of everyone has been completed. That is, it is determined whether all of the passengers and crew members have been registered in guided groups and the lifeboats have been determined. If it is determined that rescue of everybody has not been completed (No), the routine is returned to Step S19, and the processing is repeatedly executed. In contrast, if it is determined that rescue of everybody has been completed (Yes), the processing is completed.

When the crew members guide the passengers to get on the predetermined lifeboats 46 and 47; for example, by detection of persons getting on the boats through RFID gates arranged at embarkation entrances of the lifeboats 46 and 47, whether or not the rescue of everyone has been completed may be determined.

As described above, provided in the evacuation guiding system for a ship, according to this embodiment are: muster stations in the ship, the muster stations serving as a plurality of gathering places surrounded by fire protection constructions; the plurality of lifeboats 46 and 47 equipped in the ship hull 10; the personal distribution information obtaining unit 101 that obtains, based on information from the cameras 111 provided in the ship, the passenger position information in predetermined areas in the ship; the evacuation route calculating unit 102 that formulates, based on the passenger position information from the personal distribution information obtaining unit 101 and the passage passability information set from the event information of evacuation, evacuation routes; the evacuation information managing unit 103 that shares information with the personal distribution information obtaining unit 101 and the evacuation route calculating unit 102, and outputs the evacuation routes formulated by the evacuation route calculating unit 102; the evacuation guiding unit 104 that modifies, based on the evacuation routes output by the evacuation information managing unit 103, the evacuation guidance display provided in passages in the ship; and the gathering place managing unit 105 that assigns the lifeboats 46 and 47 to be boarded, to a plurality of passengers who have evacuated to the plurality of muster stations.

Therefore, the personal distribution information obtaining unit 101 obtains the passenger position information in the areas from the information of the cameras 111, the evacuation route calculating unit 102 formulates the evacuation routes from the passenger position information and the passage passability information, the evacuation information managing unit 103 outputs the evacuation routes, the evacuation guiding unit 104 modifies, based on the evacuation routes, the evacuation guidance display, and the gathering place managing unit 105 assigns the lifeboats 46 and 47 to the passengers who have evacuated to the muster stations. Therefore, when an unexpected event occurs, passengers are able to be guided for evacuation to muster stations surrounded by fire protection constructions in a ship quickly in a short period of time without confusion, and safety of the passengers is able to be secured.

In the evacuation guiding system for a ship, according to this embodiment, the cameras 111 (111a and 111b) are provided in the passages 44 and 45 provided in the transverse bulkheads 31, 32, 33, 34, 35, and 36 of the ship, and at the elevators 71 and stairways 72 communicating into the upper and lower decks. Therefore, images of horizontally moving passengers and vertically moving passengers are able to be captured by the plurality of cameras 111, and passengers moving among the respective areas are able to be properly grasped, and the passenger position information in the areas is able to be obtained with a high degree of accuracy.

In the evacuation guiding system for a ship, according to this embodiment, the personal distribution information obtaining unit 101 estimates the numbers of passengers in the areas by obtaining the passenger position information through recognition of movement directions of the passengers based on the images acquired by the cameras 111. Therefore, since the personal distribution information obtaining unit 101 estimates the numbers of passengers in the areas by obtaining the passenger position information through the recognition of movement directions of the passengers at all times, the personal distribution information obtaining unit 101 is able to obtain the numbers of passengers in the areas with a high degree of accuracy when a disaster occurs.

Provided in the evacuation guiding system for a ship, according to this embodiment, are: the RFID gates 112 that are provided at the doorways of the gathering places and are able to detect the RFID tags carried by the passengers; and the operation terminals 116, which are able to share information wirelessly with the gathering place managing unit 105, and through which passengers to get on the lifeboats 46 and 47 are input based on the detection information from the RFID gates 112. Therefore, since the RFID tags carried by the passengers are detected by the RFID gates 112 provided at the doorways of the muster stations, and the operation terminals 116 share this detection information, crew members are able to identify passengers who have evacuated to the muster stations by operating these operation terminals 116 and are able to determine passengers to get on the lifeboats 46 and 47 quickly. In this case, for a child not carrying an RFID tag or a passenger who has lost the RFID tag, a configuration, in which RFID tags and face authentication with a camera are used together, may be adopted.

In the evacuation guiding system for a ship, according to this embodiment, when passengers to get on the lifeboats 46 and 47 are input by the operation terminal 116, the gathering place managing unit 105 counts the number of passengers that have been input, and if this number of passengers reaches the passenger capacity of the lifeboats 46 and 47, the gathering place managing unit 105 specifies other lifeboats 46 and 47. Therefore, just by the crew member inputting the passengers to get on the lifeboats 46 and 47 through the operation terminal 116; the gathering place managing unit 105 is able to efficiently execute the operation of assigning the passengers to the lifeboats 46 and 47 and execute the evacuation guiding operation quickly, by counting the number of input passengers and specifying other lifeboats 46 and 47 when the number of passengers reaches the passenger capacity of the lifeboats 46 and 47.

In the evacuation guiding system for a ship, according to this embodiment, based on the passenger position information and the passage passability information, the evacuation route calculating unit 102 formulates the evacuation routes that enable the passengers to evacuate to the muster stations in the shortest period of time. Therefore, since the evacuation routes are formulated according to, instead of shortness of the evacuation routes, shortness of the evacuation time period, the passengers are able to be efficiently evacuated to the muster stations quickly.

In the evacuation guiding system for a ship, according to this embodiment, the evacuation route calculating unit 102 generates, based on the passenger position information and the passage passability information, the recommended evacuation route file having: the guided evacuation directions to the plurality of muster stations; the numbers of passengers expected to evacuate to the plurality of muster stations; expected times of completion of evacuation when the evacuation to the plurality of muster stations is completed; and the expected time periods for completion of evacuation up to the completion of the evacuation to the plurality of muster stations. Therefore, by a prediction for evacuation of passengers to muster stations being made, forms of evacuation guidance at the respective muster stations are able to be grasped, and actual guidance for evacuation of the passengers is able to be executed efficiently.

In the evacuation guiding system for a ship, according to this embodiment, the plurality of lifeboats 46 and 47 are supported at broadsides, where embarkation and disembarkation is possible from and to the lifeboat embarkation deck, on which the muster stations are provided. Therefore, passengers who have evacuated to the muster stations are able to be guided to the lifeboats 46 and 47 from the lifeboat embarkation deck that is at the same position, and the evacuation guiding operation is able to be executed efficiently.

In the evacuation guiding system for a ship, according to this embodiment, the gathering places are the muster stations surrounded by fire protection bulkheads. Therefore, by the muster stations being used also as the gathering places, gathering places do not need to be secured separately in the ship, and space in the ship is able to be used efficiently.

In the evacuation guiding system for a ship, according to this embodiment, the central safety control unit 201, which actuates alarm devices based on the input event information of evacuation, is provided, and the central safety control unit 201 outputs the event information to the evacuation information managing unit 103. Therefore, by the evacuation information managing unit 103 sharing the information with the central safety control unit 201, efficiency of the evacuation guiding process is able to be increased and safety of the ship is able to be improved.

Further, in the evacuation guiding method for a ship, according this embodiment, passengers are guided for evacuation by: formulating evacuation routes from passenger position information and event information of evacuation; modifying, based on the evacuation routes, evacuation guidance display provided in passages in the ship; obtaining passenger ID information by the RFID gates 112 detecting RFID tags carried by passengers when the passengers evacuate to muster stations, the RFID gates 112 being provided at doorways of the muster stations; and the operation terminals 116 receiving the passenger ID information and the event information, the operation terminals 116 being held by crew members; and assigning a plurality of passengers to the lifeboats 46 and 47 to be boarded based on screen information on the operation terminals 116.

Therefore, when an unexpected event occurs, passengers are able to be guided for evacuation to gathering places surrounded by fire protection constructions in a ship quickly in a short period of time without confusion, and safety of the passengers is able to be secured.

REFERENCE SIGNS LIST

10 SHIP HULL
11 SHIP BOW
12 SHIP STERN
13 SHIP BOTTOM
14 PORT
15 STARBOARD
31, 32, 33, 34, 35, 36 TRANSVERSE BULKHEAD
41 EIGHTH DECK
46, 47 LIFEBOAT
51 SEVENTH DECK (LIFEBOAT EMBARKATION DECK)
52 THEATER (MUSTER STATION, GATHERING PLACE, CONVENING ROOM)
53 LOUNGE BAR (MUSTER STATION, GATHERING PLACE, CONVENING ROOM)
54 SHOP (MUSTER STATION, GATHERING PLACE, CONVENING ROOM)
55 RESTAURANT (MUSTER STATION, GATHERING PLACE, CONVENING ROOM)
56 CAFE (MUSTER STATION, GATHERING PLACE, CONVENING ROOM)
57 RESTAURANT (MUSTER STATION, GATHERING PLACE, CONVENING ROOM)
58, 59 PROMENADE
61 SIXTH DECK
62 THEATER (MUSTER STATION, GATHERING PLACE, CONVENING ROOM)
63 LOUNGE BAR (MUSTER STATION, GATHERING PLACE, CONVENING ROOM)
101 PERSONAL DISTRIBUTION INFORMATION OBTAINING UNIT
102 EVACUATION ROUTE CALCULATING UNIT
103 EVACUATION INFORMATION MANAGING UNIT
104 EVACUATION GUIDING UNIT
105 GATHERING PLACE MANAGING UNIT
107 SAFETY MANAGING UNIT
111, 111a, 111b CAMERA
112, 112a, 112b RFID GATE
113 DISASTER INFORMATION INPUT UNIT
114 DIGITAL SIGNAGE
115 DISPLAY LAMP
116 OPERATION TERMINAL

The invention claimed is:

1. An evacuation guiding system for a ship, the evacuation guiding system comprising:
a plurality of gathering places surrounded by a fire protection construction in the ship;
a plurality of lifeboats equipped in a hull of the ship;
a personal distribution information obtaining unit configured to obtain, based on information from a camera provided in the ship, passenger position information in a predetermined area in the ship;
an evacuation route calculating unit configured to formulate, based on the passenger position information from the personal distribution information obtaining unit and passage passability information set from event information of evacuation, an evacuation route;
an evacuation information managing unit configured to share information with the personal distribution information obtaining unit and the evacuation route calculating unit, and output the evacuation route formulated by the evacuation route calculating unit;
an evacuation guiding unit configured to modify, based on the evacuation route output by the evacuation information managing unit, evacuation guidance display provided in a passage in the ship; and
a gathering place managing unit configured to assign the lifeboats to be boarded, to a plurality of passengers who have evacuated to the plurality of gathering places, wherein
the evacuation route calculating unit is configured to generate, based on the passenger position information and the passage passability information, a recommended evacuation route file having: guided evacuation directions to the plurality of gathering places; the numbers of passengers expected to evacuate to the plurality of gathering places; expected times of completion of evacuation when the evacuation to the plurality of gathering places is completed; and expected time periods for completion of evacuation up to the completion of the evacuation to the plurality of gathering places.

2. The evacuation guiding system for the ship, according to claim 1, wherein the camera is provided in a horizontal passage provided in a transverse bulkhead of the ship, and in a vertical passage communicating into upper and lower decks.

3. The evacuation guiding system for the ship, according to claim 1, wherein the personal distribution information obtaining unit is configured to obtain the passenger position information by recognizing a movement direction of a passenger based on an image acquired by the camera, and estimate the number of passengers in the area.

4. The evacuation guiding system for the ship, according to claim 1, wherein an RFID gate that is provided at a doorway of the gathering places and that is able to detect an RFID tag carried by a passenger, and a terminal that is able to share information wirelessly with the gathering place managing unit and that inputs, based on detection information from the RFID gate, a passenger to get on the lifeboats, are provided.

5. The evacuation guiding system for the ship, according to claim 4, wherein the gathering place managing unit is configured to count the number of passengers input when the passenger to get on the lifeboats is input by the terminal, and specify another lifeboat when this number of passengers reaches a passenger capacity of the lifeboats.

6. The evacuation guiding system for the ship, according to claim 1, wherein the evacuation route calculating unit is configured to formulate, based on the passenger position information and the passage passability information, evacuation routes, through which passengers are able to evacuate to the gathering places in a shortest period of time.

7. The evacuation guiding system for the ship, according to claim 1, wherein the plurality of lifeboats are supported at broadsides where embarkation and disembarkation is possible from and to a lifeboat embarkation deck, on which the gathering places are provided.

8. The evacuation guiding system for the ship, according to claim 1, wherein the gathering places are muster stations surrounded by fire protection bulkheads.

9. The evacuation guiding system for the ship, according to claim 1, wherein a central safety control unit configured to actuate an alarm device, based on the event information of evacuation that has been input, is provided, and the central safety control unit is configured to output the event information to the evacuation information managing unit.

10. An evacuation guiding method for a ship having a plurality of gathering places that have been preset in the ship, a plurality of lifeboats equipped in a hull of the ship, and a central safety control unit, to which event information of evacuation is input, wherein
an evacuation route is formulated from passenger position information and the event information of evacuation,
evacuation guidance display provided in a passage in the ship is modified based on the evacuation route,
RFID tags of passengers are detected by RFID gates provided at doorways of the gathering places and passenger ID information is obtained, when the passengers evacuate to the gathering places,
the lifeboats to be boarded by passengers are assigned based on the passenger ID information received from a terminal of a crew member and screen information of the event information, and the passengers are guided for evacuation, and
the formulating includes generating, based on the passenger position information and the passage passability information, a recommended evacuation route file having: guided evacuation directions to the plurality of gathering places; the numbers of passengers expected to evacuate to the plurality of gathering places; expected times of completion of evacuation when the evacuation to the plurality of gathering places is completed; and expected time periods for completion of evacuation up to the completion of the evacuation to the plurality of gathering places.

11. An evacuation guiding method for a ship having a plurality of gathering places that have been preset in the ship, a central safety control system, to which event information of evacuation is input, and a plurality of lifeboats, wherein
passenger ID information is received at each of doorways of the plurality of gathering places upon an event of evacuation,
based on the passenger ID information and screen information on a terminal that displays thereon the event information from the central safety control system, passengers are guided for evacuation from the gathering places to any of the lifeboats,
an evacuation route is formulated from passenger position information and the event information of evacuation, and
the formulating includes generating, based on the passenger position information and the passage passability information, a recommended evacuation route file having: guided evacuation directions to the plurality of gathering places; the numbers of passengers expected to evacuate to the plurality of gathering places; expected times of completion of evacuation when the evacuation to the plurality of gathering places is completed; and expected time periods for completion of evacuation up to the completion of the evacuation to the plurality of gathering places.

* * * * *